United States Patent

[11] 3,600,035

[72] Inventor Georges Vondrejs
953 Cherrier Street, Montreal 132, Quebec, Canada
[21] Appl. No. 855,882
[22] Filed Sept. 8, 1969
[45] Patented Aug. 17, 1971
[32] Priority Sept. 20, 1968
[33] Canada
[31] 0,305,55

[54] AUTONOMOUS SEAT FOR CHAIR
2 Claims, 9 Drawing Figs.

[52] U.S. Cl. .................................................. 297/230, 297/457
[51] Int. Cl. .................................................. A47c 7/02
[50] Field of Search .................................... 297/351, 352, 350, 230, 231, 253, 457, 456, 460

[56] References Cited
UNITED STATES PATENTS

| | | | |
|---|---|---|---|
| 633,012 | 9/1899 | Kidd et al. | 297/350 |
| 1,125,801 | 1/1915 | Blood | 297/456 |
| 1,400,717 | 12/1921 | Benson et al. | 297/451 |
| 1,422,915 | 7/1922 | Benson et al. | 297/457 |
| 2,040,463 | 5/1936 | Brueckl | 297/253 |
| 2,061,923 | 11/1936 | Sherman et al. | 297/456 |
| 2,281,341 | 4/1942 | Turner | 297/457 |
| 2,542,931 | 2/1951 | Lightfoot | 297/457 |
| 3,264,034 | 8/1966 | Lawson | 297/456 |
| 3,507,538 | 4/1970 | Stoller | 297/231 X |
| 3,519,308 | 7/1970 | Kasman et al. | 297/460 X |

FOREIGN PATENTS

| | | | |
|---|---|---|---|
| 614,775 | 12/1948 | Great Britain | 297/457 |

Primary Examiner—Francis K. Zugel
Attorney—Raymond A. Robic

ABSTRACT: Seats intended for use on sundry supports. They are formed with a rigid frame having a back portion and a seat portion. The frame defines a continuous closed outline having two lateral sides and two transversal sides and these sides are spread by a constant and predetermined distance. A removable bar is transversely fixed to the two lateral sides of the frame at the junction between the frame and maintaining said predetermined distance constant. Finally, the seats having covering means solid over the frame and means for securing the covering means over the frame, the covering means forming a rigid and nonextensible stretched body to receive the weight of a person.

PATENTED AUG 17 1971 3,600,035

INVENTOR
Georges VONDREJS

ATTORNEY

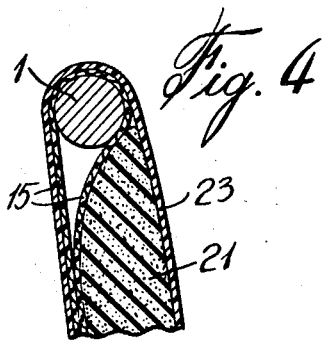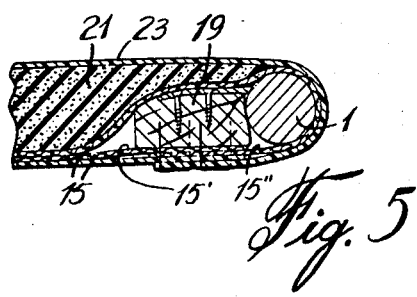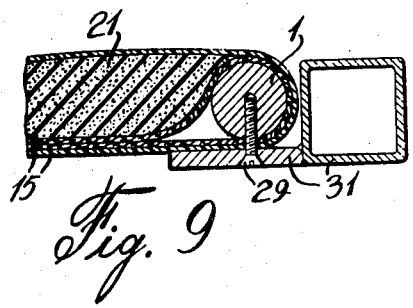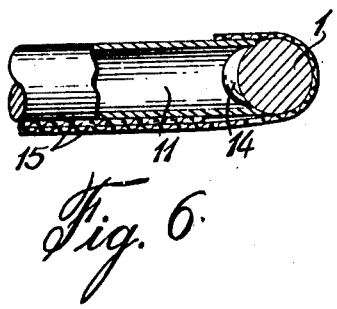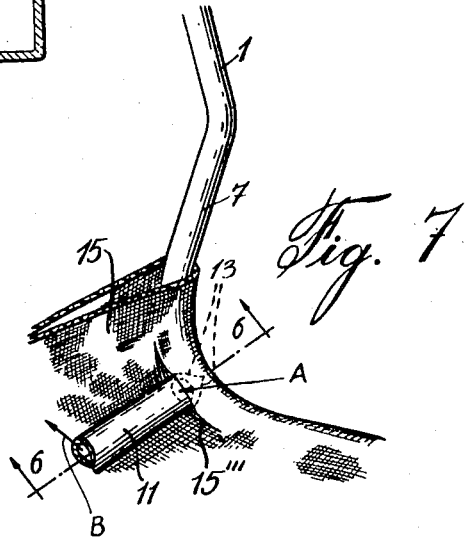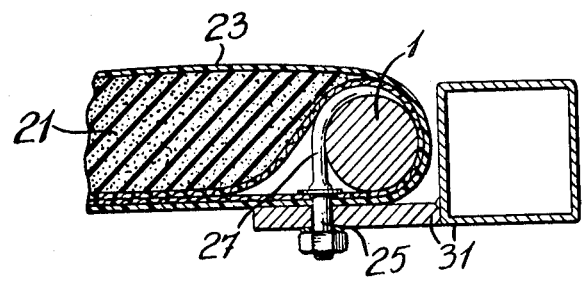
INVENTOR
Georges VONDREJS
ATTORNEY

AUTONOMOUS SEAT FOR CHAIR

The present invention relates to a removable, autonomous or self-standing seat intended for mounting on a sundry support, such as a chair. The seat according to the invention is extremely comfortable and has a good appearance.

There is no need here to enumerate the various categories of chairs which are available in the stores and which are indispensable in everyday use.

The seat of the present invention which can be used with all kinds of chairs is mainly distinguished from other seats by the fact that it is practical, good looking, easy to manufacture, extremely comfortable and easily adaptable to different chairs. The seat of the present invention is particularly characterized in that it comprises a rigid frame made of a single endless steel rod defining an uninterrupted closed outline forming a back portion and a seat portion; a removable steel tube extending transversely between the transverse sides at the junction between the seat and the back portions to hold the transverse sides at a predetermined distance, the ends of the tubes having a contour that fits over the wall of the steel rod on the transverse sides, and means, on the transverse sides and at said junction, protruding inside the steel tube ends across the aforesaid contour to prevent slipping of the tube. An enveloping canvas covering having a front and a back ply is slipped tightly over the frame, the front ply being slit laterally at the junction to allow both plies to lie behind the transverse steel tube between the lateral sides. A filler mat of resilient material is secured over the front ply of the canvas covering and over the transverse tube within the boundary of the frame. Finally, a facing covering is slipped tightly over the frame, the canvas covering and the resilient mat.

One advantage of the seat according to the invention is that it forms an independent and autonomous structure. By independent and autonomous structure, it should be understood that the manufactured seat is self-supporting and may be used without any additional holding means, such as auxiliary securing means provided or the support. This advantage is due to the nature of the materials used in the manufacture of the seat and also to the presence of the transverse bar which is wedgedly mounted between the two portions of the seats.

Other advantages and features will be apparent from the description which follows and with reference to the appended drawings.

The drawings show by way of nonlimitative examples, different ways of manufacturing the seat according to the invention, and different methods of fixing the seat to a support.

FIG. 4 is a cross section taken along line 4–4 of FIG. 1;

FIG. 5 is a cross section taken along line 5–5 of FIG. 1;

FIG. 6 is a cross section taken along line 6–6 of FIG. 7 which follows;

FIG. 7 is a partial perspective view showing how the transverse bar is fixedly mounted at the junction between the seat portion and the back portion of the seat, the bar being inserted over a first canvas covering; and FIGS. 8 and 9 illustrate two methods of fixing the seat to the base of a chair.

Figure 1:
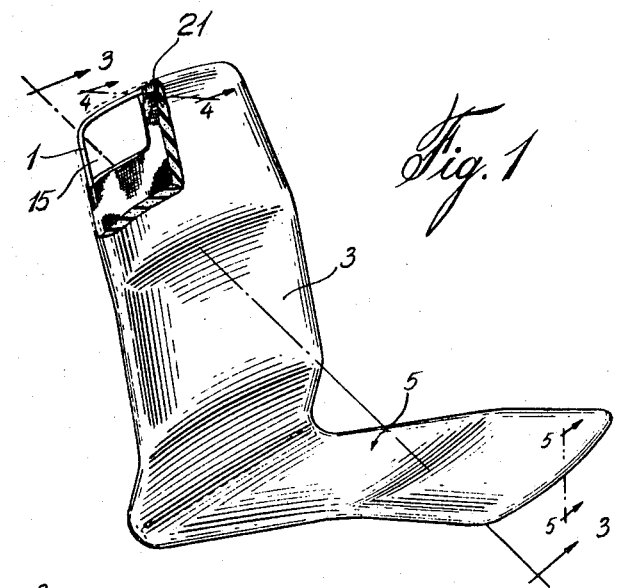
FIG. 1 is a perspective view, partially in cross section, of the seat according to the invention.
Figure 2:
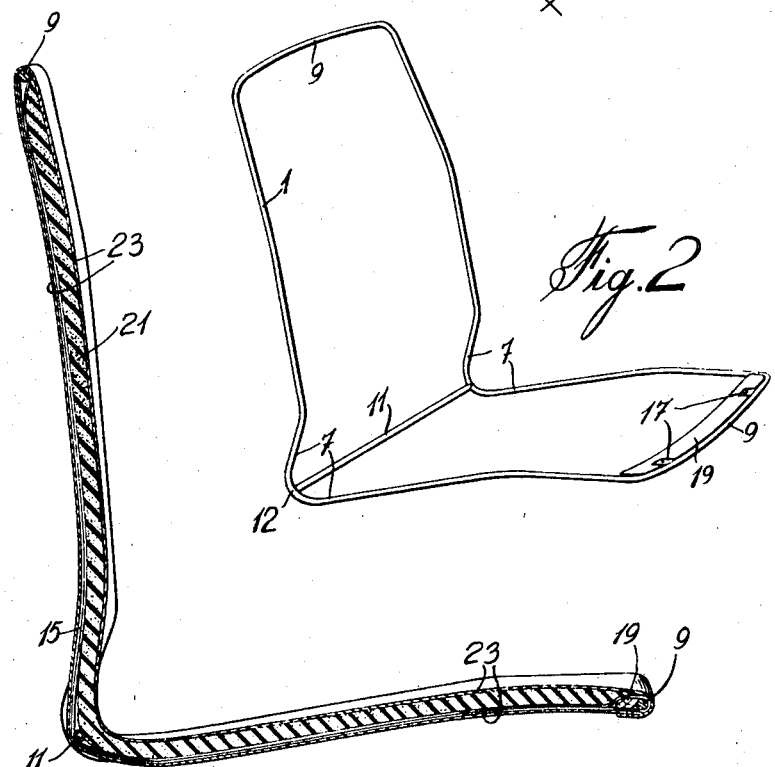
FIG. 2 is a perspective view of the frame forming the structure of the seat.
Figure 3:
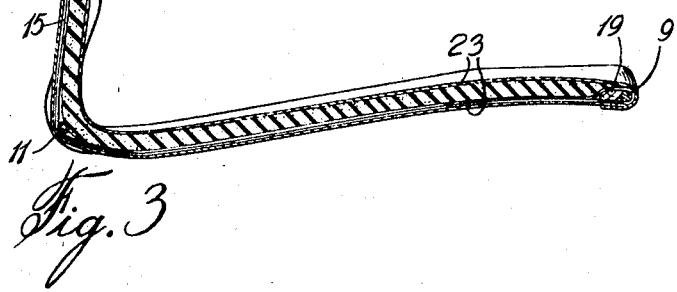
FIG. 3 is a cross section taken along line 3–3 of FIG. 1.

As shown in the drawings, the seat according to the present invention generally comprises an endless frame 1 which is either made of metal, laminated wood or any other suitable material. The frame forms a continuous outline and has a back portion 3 and a seat portion 5. The shape of the frame is adapted to give maximum comfort. Thus its shape is especially designed to follow the exact shape of the body. The frame has two lateral sides 7 and two transverse sides 9. It is made either of a metallic rod, such as steel, preferably one-half inch, or laminated wood, or any other suitable material as previously stated. The frame, in this shape, forms a rigid, nonextensible structure. However, a transverse bar 11 is fixedly mounted at the junction 12 between the two portions 3 and 5 for increasing the rigidity of the structure. The transverse bar is either made of steel, laminated wood, or any other suitable material and is removably fixed to the said frame. To this end, the ends 13 of the transverse bar are concave (see FIGS. 6 and 7) so as to follow the natural contour of the frame member. The transverse bar is not welded or screwed, on the contrary, it is wedged between the two lateral sides 7 of the frame 1. Wedging is enhanced due to the fact that the transverse bar 11 is inserted over the two plies of a canvas covering 15 through a slit 15'. In this manner, a pressure is exerted at both ends of the bar 11 (see arrow A, FIG. 7) to fixedly maintain the same in place. Furthermore, the bar 11, produces a pressure on the central portion of the covering 15, (arrow B, FIG. 7) and therefore presses covering 15 underneath bar 11 at junction 12. Stopping means, such as lugs or weld spots 14 (FIG. 6) are also provided to prevent sliding of the said transverse bar 11.

The front part of the seat portion 5 is provided with small holding plates 17, which serve to retain a plywood strip 19, the latter being used to bound the seat coverings. The coverings will be described in detail in the next paragraph.

The coverings or upholstered part of the seat comprise the previously mentioned canvas covering 15 comprising two symmetrical parts sewn together along three sides thereof leaving an open fourth side corresponding to the front part of the seat portion 5. This first covering 15 is adapted to slide over the frame and to be stretched tight. It is fixed to the plywood strip 19 through its overlapping ends 15', 15'' (FIG. 5) by fastening means (not illustrated in the drawings).

A filter mat 21 made of foamed rubber in a single piece is adhesively fixed to the entire receiving surface of the first covering 15. Finally, a covering layer 23 forming an outside coating and made of vinyl or fabric, is fitted over the frame 1 in the same manner as the canvas covering 15 and is also fastened to the plywood strip 19.

FIGS. 8 and 9 respectively shown two embodiments of means for fixing the seat to support 31 in a chair seat. The first of said means is a bolt, nut 25 and a hook 27 (FIG. 8) and the second one is a screw 29 (FIG. 9).

I claim:

1. Seats intended for use on sundry supports comprising:
    a. a rigid frame having a back portion and a seat portion;
    b. said frame being made of a steel rod and defining a continuous closed outline having two lateral sides and two transverse sides, said sides being spread apart a constant and predetermined distance;
    c. a removable steel tube transversely fixed to the two lateral sides of said frame at the junction between said back portion and said seat portion, said steel tube stiffening said frame and maintaining said predetermined distance constant;
    d. covering means slid over said frame and means for securing said covering means over said frame, said covering means forming a rigid and nonextensible stretched body to receive the weight of a person, and
    e. wherein said covering means comprises: a first canvas covering which, upon being inserted beneath said removable tube, is pressed beneath said bar at the said junction formed by the back portion and the seat portion of said frame, said steel tube having both ends concave to follow the contour of said frame steel rod, said seats further comprising retaining means, made of weld spots, provided between the removable steel tube and the steel rod for firmly holding the steel tube in place.

2. A self-supporting seat for use on sundry supports and comprising:
    a. a rigid frame having a back portion and a seat portion;
    b. said frame being made of a single endless steel rod defining an uninterrupted closed outline having two lateral sides and two transverse sides, said transverse sides being held apart a predetermined distance;

c. a removable steel tube extending transversally between said transverse sides at the junction between said seat and back portions to hold said transverse sides at said predetermined distance, the ends of said tube having a contour fitting over the wall of said steel rod on said transverse sides;

d. means, on said transverse sides and at said junction, protruding inwardly of said frame and inside said tube ends across said contour to prevent slipping of said tube;

e. an enveloping canvas covering having a front and a back ply and slipped tightly over said frame, said front ply being slit adjacent said lateral sides and inwardly of said frame at said junction to allow both plies to lie behind said transverse steel tube between said lateral sides;

f. a filler mat of resilient material secured over said front ply of said canvas covering and over said transverse tube within the boundary of said frame, and g. a facing covering slipped tightly over said frame, canvas covering and resilient mat.